United States Patent [19]
Prince

[11] 3,904,723
[45] Sept. 9, 1975

[54] CONCRETE PRODUCT MANUFACTURING SYSTEM AND METHOD

[75] Inventor: Douglas F. Prince, Houston, Tex.

[73] Assignee: Castone Development Corporation, Houston, Tex.

[22] Filed: Nov. 16, 1972

[21] Appl. No.: 307,154

[52] U.S. Cl. .................. 264/71; 214/6 A; 259/147; 259/148; 264/79; 264/90; 264/230; 264/333; 264/349; 264/DIG. 43; 425/200
[51] Int. Cl. ....................... B28b 1/08; B28b 1/10
[58] Field of Search .......... 264/69, 71, 72, 79, 101, 264/90, 349, 230, 87, 333, DIG. 43; 259/147, 148; 214/6 A; 425/200

[56] References Cited
UNITED STATES PATENTS

| | | | |
|---|---|---|---|
| 1,220,338 | 3/1917 | Humphey | 259/148 |
| 1,947,345 | 2/1934 | Lillard | 259/148 |
| 2,256,361 | 9/1941 | Straub | 264/71 X |
| 2,297,504 | 9/1942 | Salvaneschi | 264/71 |
| 2,585,756 | 2/1952 | Eschenbrenney | 264/87 |
| 3,192,594 | 7/1965 | Fougea | 264/101 X |
| 3,427,374 | 2/1969 | Jackson et al. | 264/79 |
| 3,499,069 | 3/1970 | Seigle | 264/71 |

FOREIGN PATENTS OR APPLICATIONS

| | | | |
|---|---|---|---|
| 809,082 | 2/1959 | United Kingdom | 264/79 |

Primary Examiner—Robert F. White
Assistant Examiner—Thomas P. Pavelko
Attorney, Agent, or Firm—Torres & Berryhill

[57] ABSTRACT

A method of manufacturing concrete products comprising the steps of: combining raw materials, including cement and aggregates; blending the raw materials together; continuously feeding the blended materials onto a mixing conveyor; continuously adding liquid to the blended materials as they move along the conveyor; continuously mixing the liquid and blended materials together to form a wet concrete mixture as the mixture moves along the conveyor; continuously feeding the wet mixture into a receiver; feeding the wet concrete mixture from the receiver into a mold to form precured concrete products; removing the precured concrete products from the mold; stacking the precured concrete products in layers on top of preceding layers; and curing the precured concrete products.

7 Claims, 3 Drawing Figures

FIG. 1

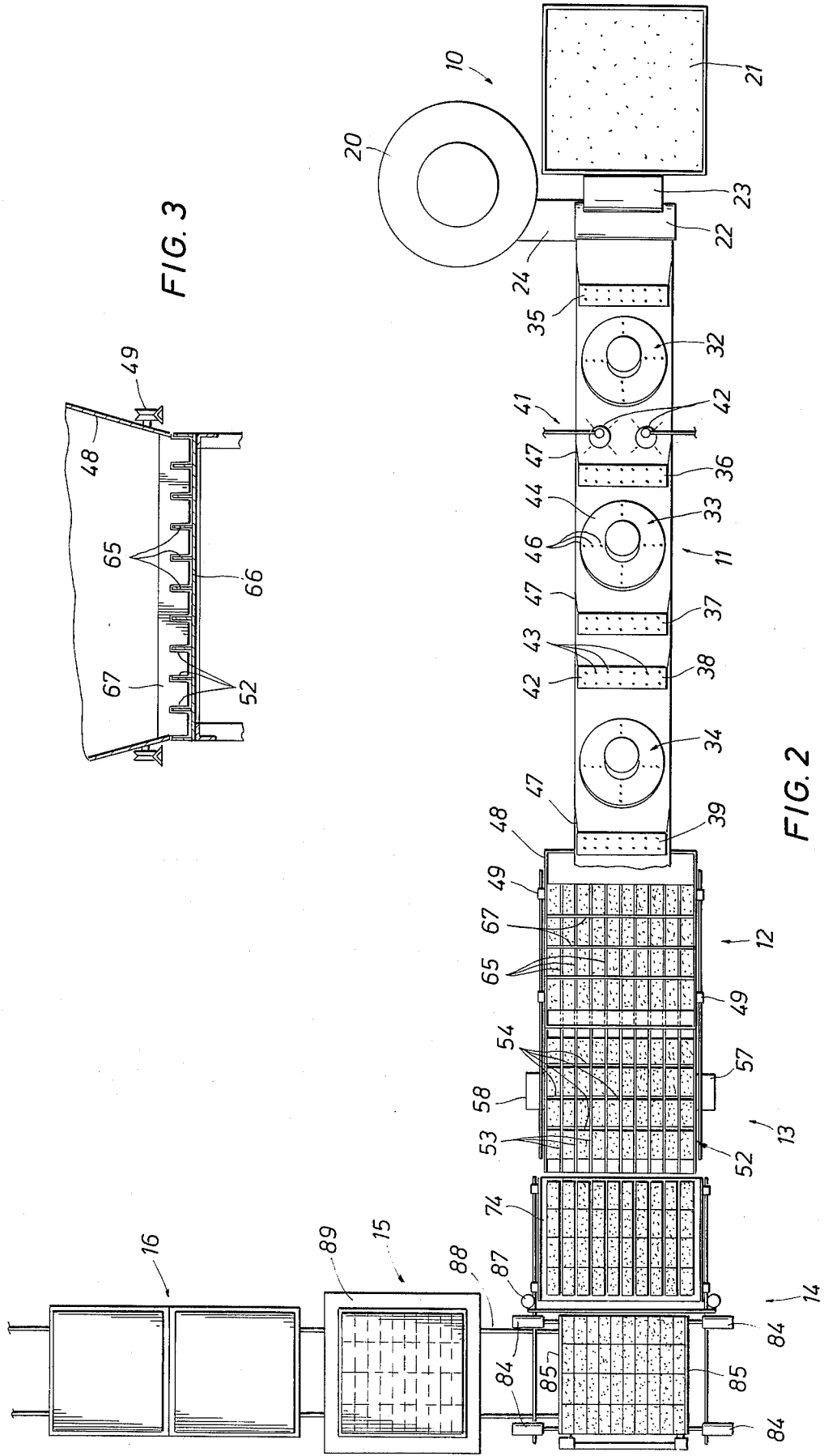

CONCRETE PRODUCT MANUFACTURING SYSTEM AND METHOD

BACKGROUND OF THE INVENTION

1. Field of the Invention

The present invention pertains to methods and systems for manufacturing concrete products. In particular it concerns a continuous method and system for manufacturing concrete products, such as concrete brick.

2. Description of the Prior Art

In the past concrete brick manufacturing has been basically a batch process generally comprising the following steps:
   a. batch weigh the aggregate and cement materials;
   b. batch mix the materials;
   c. deposit the mixed materials into a brick mold by batches, the brick molds having pressure heads by which the material is compacted into the mold;
   d. removing the bricks from the mold and placing them on a pallet;
   e. placing the pallets in racks;
   f. placing the racks on transfer cars;
   g. placing the racks on the cars in an autoclave where the bricks are cured;
   h. transferring the bricks to an area where they are depalletized and "cubed", i.e., stacked in cubes; and
   i. delivering the cubes to storage yards.

There are several disadvantages of batch systems. Batch systems require relatively large equipment for mixing and pouring of the wet concrete mixture. The autoclaves required for curing in such systems are also relatively large items of equipment and usually require heat maintenance around the clock. Such systems naturally require large capital investments and are expensive to maintain and operate. As many as fifty or sixty people may be required to operate such a system producing a hundred thousand bricks a day. Such systems also result in material waste since formula changes cannot be made with small volume changes.

Of course, over the past years improvements have been made in these processes. However, the universally accepted methods of manufacturing concrete products are still of the batch type.

SUMMARY OF THE PRESENT INVENTION

The system and method of the present invention involves a continuous, as opposed to batch, process for maanufacturing concrete products, such as bricks, in which all steps are performed continuously and with precise quality and quantity control. In general, the method involves the following steps:
   a. continuous weighing, blending and mixing of the raw materials;
   b. continuously feeding the raw materials into a blender crusher where any large clumps of material are broken and where the material is preblended;
   c. continuously feeding from the blender onto a mixing conveyor, the dry blend material being first acted on by stationary and rotating mixing teeth; then moisture, such as water or liquid chemicals, is added by spray apparatus while other fixed and rotating mixing teeth further mix the wet materials as they travel up the conveyor;
   d. continuously feeding the thoroughly mixed wet concrete materials into a receiver or surge hoppers. (It is emphasized that this is a continuous feed and with adequate controls a formula change can be made with small volume changes without resulting in the loss from large volumes necessary for changes in batch processing. The equipment is automatically controlled and slaved to the process needs, both quantity and quality, including moisture, fine aggregates, coarse aggregates, and cement);
   e. periodically moving the surge hopper to a position over a brick mold where wet concrete is fed into the mold (The mold is provided with vibrators causing the material to be packed to the necessary density for the product being produced. After the mold is filled the hopper moves back to its initial position. The hopper is always underneath the discharge of the conveyor so that wet concrete mixture is continuously being fed into the hopper. The design of the mold eliminates the conventional pressure head press used in prior arts systems to compact the material to the molding machine.);
   f. removing the compacted material or precured bricks from the mold;
   g. transferring the precured bricks to a cubing station where they are stacked in layers until a cube is accumulated (The bricks are pushed together to form a cube of wet bricks.);
   h. transferring the cubed bricks to a heat shrink station where a thermoplastic bag is placed around the cube and heated by a heating hood so that the plastic is sealed around the cube; and
   i. transferring the cube sealed in plastic to a storage area where it sets for curing (The curing is affected by the heat of hydration which is sealed within the plastic bag. Furthermore, the plastic bag serves as protection during storage and transfer to building sites.).

The overall system of the present invention for continuously producing concrete products is considered to be a new concept. It provides much better control of quality and quantity than the prior art batch systems. Since the necessity of large batches is eliminated, the equipment size can be substantially reduced. This naturally results in a smaller capital investment. Furthermore, the continuous manufacturing system of the present invention can be operated by substantially reduced manpower. For example, to produce the same number of bricks in prior art batch systems which require 50 to 60 men, the present system could be operated with only five or six men. This creates a tremendous savings in labor cost.

There are several features of the present invention which are considered unique. The continuous weighing and mixing of the raw materials as they move up a conveyor is considered to be unique. The construction and operation of the hopper or receiver and mold are also considered new. By precompacting in the hopper, vibration of the mold, the static head on the materials being placed in the mold and partial vacuum injection, the concrete products are superior in quality and can be more rapidly produced.

By the quick mixing and molding operation of the present invention, advantage can be taken of the early or "false" set of concrete not heretofore utilized. By taking advantage of the early false set the bricks can be stacked in cubes prior to curing. So far as is know by the inventor, this has never been done before.

The unique way in which the bricks are then cured is also considered to be new. The precured cubed bricks are sealed within a water impermeable material, such as plastic, by heat shrinking of the plastic around the bricks. Then the bricks are stored and the heat of hydration allowed to cure the bricks. This completely eliminates the necessity for autoclave type curing.

Many other features and advantages of the invention will be apparent from the description which follows in conjunction with the accompanying drawings.

BRIEF DESCRIPTION OF THE DRAWINGS

FIG. 1 is a schematic elevation view of a concrete product manufacturing system, according to the present invention;

FIG. 2 is a schematic plan view of the concrete product manufacturing system of the invention; and FIG. 3 is a partial cross-sectional view of a portion of the system taken along line 3—3 of FIG. 1.

DESCRIPTION OF PREFERRED EMBODIMENTS OF THE INVENTION

Referring now to the drawings, the concrete product manufacturing system of the present invention comprises, generally, a storage area 10, mixing conveyor 11, wet concrete receiver assembly 12, products mold 13, cubing station 14, heat shrink station 15 and storage area 16. The storage station 10 may include a cement bin 20 and one or more raw material hoppers 21 which contain the aggregates necessary for making concrete. Usually there would be at least two such hoppers 21, one for coarse aggregates and another for fine aggregates. The aggregates may be continuously weighed and fed into a blender crusher 22 by a conveyor belt assembly 23. The material being discharged from the aggregate bin 21 may be continuously weighed by a commercially available weighing system which utilizes a load cell to determine the weight of the material being deposited on the conveyor assembly 23. The belt may be driven by a DC electric motor connected to controls in such a manner that the belt may be speeded up or slowed down depending upon the material demands for the system. The cement bin 20 is also provided with a continuous weighing device controlling a metering valve (not shown) through which cement is fed into a screw type conveyor 24. The screw conveyor 24 may also be driven by a DC electric motor and may be varied in speed depending upon the demands of the system. Although the system shown in the drawings includes bins for the cement and aggregates, these materials may be simply dumped in piles or underground storage from which they may be continuously weighed and deposited on conveyor assemblies.

The raw materials, including cement and aggregates, are fed into the blender crusher 22 where large clumps of material are broken and where the material is preblended. The well blended materials are then continuously fed from the blender 22 onto the conveyor mixer 11.

The conveyor mixer 11 comprises a support frame 24 on which a continuous conveyor belt 25 is supported at an inclined angle. A 1 foot rise in 7½ feet has been found to be a desirable slope. The conveyor belt 25 like other conveyor assemblies may be provided with end rollers 26 and 27 about which the belt may travel. One of the rollers may be provided with an adjustment assembly to allow removal of the belt and application of the desired tension therein. The belt may be driven by a DC electric motor 30 connected to a drive shaft 31 in any suitable fashion. Like other components of the system, this DC motor may be provided with speed controls allowing the speed of the conveyor belt 25 to be adjusted to the desired rates.

One unique feature of the conveyor mixer 11 is the means by which the concrete materials may be continuously mixed as they move from one end of the conveyor to the other. Such a means comprises a plurality of mixing heads 32, 33 and 34 and a plurality of mixing rakes 35–40. The mixing rakes comprise a plurality of stationary fingers or teeth projecting downwardly toward the conveyor belt 25 so as to engage the concrete materials as they move upwardly along the belt. Each rake may be provided with a plurality of rows 41, 42 of such teeth 43 (see FIG. 2) transversely staggered relative to the conveyor belt 25 so as to work the materials laterally as they move longitudinally up the belt.

The rotating mixers 32–34 may comprise a rotating head or plate 44 from which a plurality of fingers or teeth 46 project downwardly for engagement with the materials moving up the belt 25. (See FIG. 2) The rotating heads 44 may be attached to an electric motor 45 so as to cause the teeth 46 to rotate about an axis substantially perpendicular to the plane of the belt 25. Like other components of the present system, the speed of the motors 45 may be varied depending upon the mixing action required. Since the rotating heads 44 may have a tendency to sling some of the concrete materials off of the belt, guides or chutes 47 may be provided on opposite sides of the heads to prevent this from occurring.

When the blended raw materials are first fed onto the conveyor belt 25 they are in a basically dry mixed condition. These dry mixed raw materials are further mixed by fixed rakes 35 and mixer 32 prior to the addition of any other liquids. Then liquids, usually water, are sprayed on the dry mix by a liquid applicator 41 provided with appropriate spray heads 42. The rate of application of the liquids may be controlled for the proper mixture. Moisture sensors (not shown) may be placed in the wet concrete mixture near the upper end of the conveyor to continuously monitor for this condition. Other liquids, such as accelerated setting chemicals, may be added in the same fashion. As the materials continue up the conveyor, the liquids and raw materials are continuously mixed by rakes 36–40 and mixers 33, 34 to form a homogeneous wet concrete mixture.

It is emphasized that the mixing conveyor assembly 11 provides a means whereby the raw materials are continuously being mixed and transferred to the receiver and mold assemblies 12 and 13. The rate of supply and the proportion of each component of the liquid concrete mixture is precisely controlled and may be varied as required.

Figure 1:
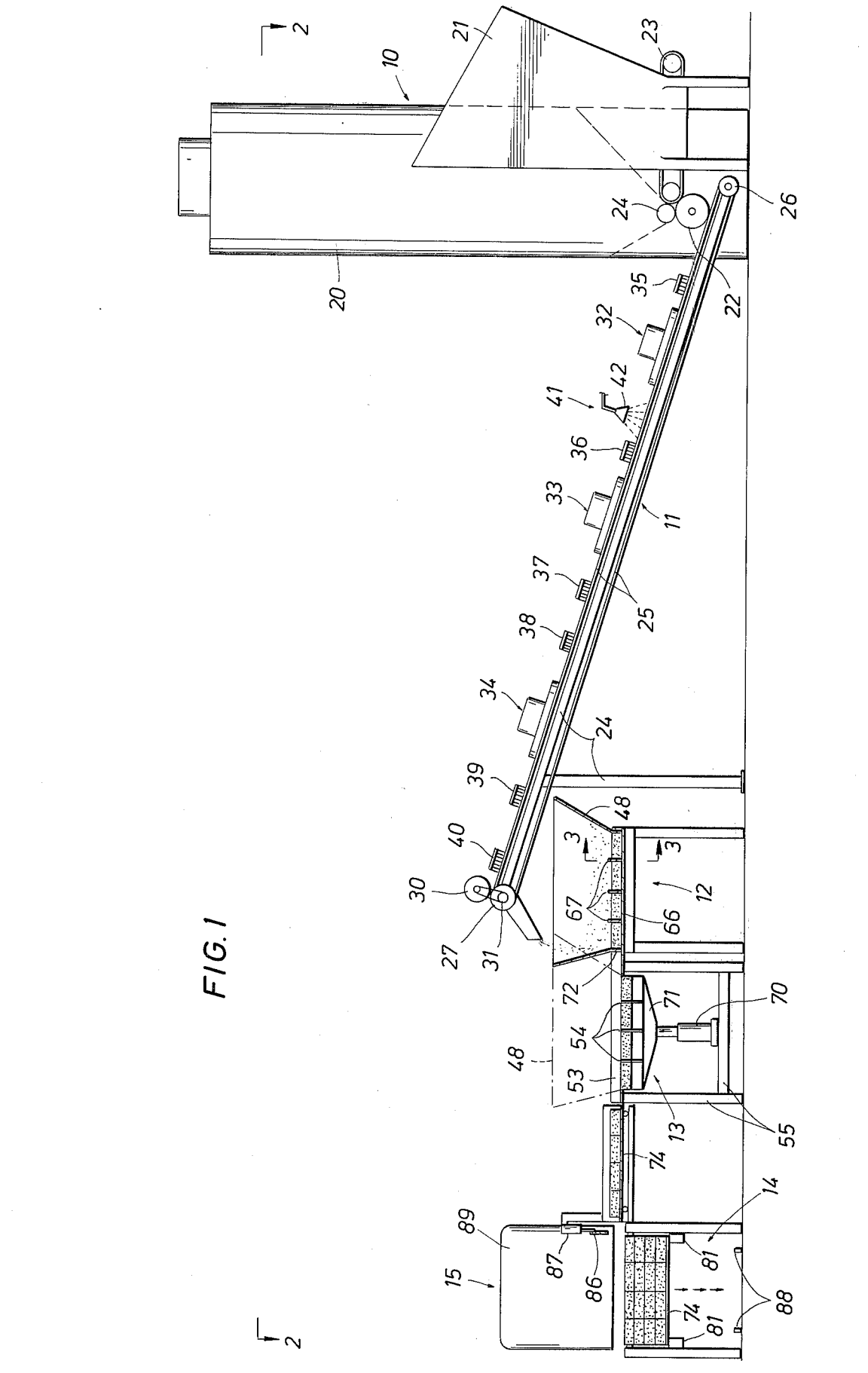

The receiver 12 and mold assembly 13 of the present invention are also unique. Contrary to batch type processes, the receiver 12 is designed to continuously receive wet concrete mixture. Measuring devices (not shown) may be attached to the receiver to assure that the receiver is always filled to a minimum level. The receiver assembly 12 includes a hopper 48 which may be mounted on wheel and axle assemblies 49 (see FIG. 3) for reciprocation between a first position, as shown in the drawing, to a second position directly above the mold assembly 13, (see dotted lines in FIG. 1). A hydraulic cylinder assembly (not shown) may be provided to effect such reciprocation. It should be noted however, that whether in the first or second position, the hopper 48 is always in a position to receive wet concrete mixture from the mixing conveyor 11.

The mold assembly 13 comprises a box like frame 52 having longitudinal and transverse partitions 53 and 54, respectively, to form the sides of molds for the concrete products to be produced. The molds illustrated in the accompanying drawings are for concrete brick. The mold box 52 is essentially stationary and is mounted on a mold machine base or frame 55. The mold box may be positioned within the frame on a set of rubber mounts or shock pads (not shown). Attached to opposite sides of the mold box are suitable vibrators 57, 58. These vibrators may be of any suitable type. The vibrators are turned on only when wet concrete material is being fed from the hopper 48 into the mold. The mold assembly 13 is provided with a multiple plunger head 71 which serves as the bottom of the mold. The plungers of plunger head 71 serve as the bottoms of the molds and may be reciprocated by hydraulic cylinder 70 from a first position, flush with plate 66, to a second position one brick thickness below the plate 66.

The longitudinal partitions 53 of the mold project upwardly from the mold box for engagement with corresponding slots 52 in the lower portion of the hopper 48. A corresponding set of longitudinal partitions or ribs 65 are also provided on the flat plate 66 of receiver assembly 12 to form a false mold. The lower portion of the hopper 48 is provided with a plurality of transverse partitions 67 (in which slots 52 are located) which correspond with the transverse partitions 54 in the mold box. When the hopper 48 is directly over the mold box these partitions 67 are in registration with the corresponding transverse partitions 54 of the mold box. The slots 52 in the transverse partitions 67 are adapted for sliding engagement with the longitudinal partitions 53 of the mold box and the longitudinal partitions 65 of the false mold. This serves in part as an alignment or registration means and also as a premold or precompaction device as will be seen hereafter.

When the hopper 48 is in the first position (shown as solid line in FIG. 1), wet concrete material flows by gravity into the false mold formed by transverse partitions 67, longitudinal partitions 65 and plate 66, where the material is partially compacted. Then the hopper 48 is reciprocated to the second position (shown as dotted lines in FIG. 2) directly above the mold assembly 13. During reciprocation, the plungers of plunger head 71 are in the first position, flush with plate 66, so that no displacement of materials from hopper 48 takes place.

After the hopper has fully moved to the second position, so that the transverse partitions 67 are aligned with the transverse mold positions 54, the plunger head 71 is retracted to its second position, allowing the precompacted material in the "preload" area of the hopper to be displaced into the mold. As the plunger head is retracted, a partial vacuum is created in the mold to assist in feeding of the wet compacted material from the bottom of the hopper. At the same time the vibrators 57, 58 are turned on. The static head exerted by the material within the hopper, the partial vacuum created by the plunger head 71, the vibration, and the preload area of the hopper 48 all combine to fill the mold and densify the material quickly and efficiently.

As the mold is filled new material enters the preload area of the hopper 48.

After the mold is filled, the hopper 48 is returned to the first position above plate 66. The movement of the hopper shears the wet concrete material along a plane coinciding substantially with the plane of plate 66. Then power may be applied to hydraulic cylinder 70 forcing the plunger head 71 upwardly and ejecting precured bricks from the mold. The plungers are maintained in this position until the hopper is again reciprocated to its second position directly over the mold 13. As the hopper 48 is moved to the second position the leading edge 72 of the hopper contacts one end of the first row of bricks pushing them off the mold onto a receiving carriage 80. The cycle is continuously repeated.

The receiving carriage 80 on which the products are deposited after being ejected from the mold comprises a portion of the cubing station 14. The cubing station also includes a pallet magazine (not shown) on which a plurality of preformed pallets may be stored for use in the cubing station. The pallets may be fed from the pallet magazine into the cubing station 14 directly adjacent to the receiving carriage 80 by a conveyor system 88. An elevator assembly 81 may be provided at this point for elevating the pallets 74 to a level for receiving one layer of brick from the receiving carriage 80. A hydraulic cylinder assembly (not shown) may be provided for causing the receiving carriage to be moved directly over a receiving pallet 74. Since a force has been applied by the hopper edge 72 to one end of the bricks to move them to this position, the voids vacated by the transverse partitions of the mold have been closed up at this time. To close the voids vacated by the longitudinal partitions, a pair of cylinder assemblies 84 attached to squeeze plates 85 move toward each other closing the voids between the bricks until the bricks are firmly gripped therebetween. A gate or plate 86 (See FIG. 1) may then be lowered by a cylinder assembly 87 at one edge of the bricks so that the receiving carriage 80 may be returned to its position for receiving another layer of bricks from the mold. Then the squeeze cylinders 84 are retracted, allowing the bricks to rest on the pallet 74. The elevator 81 may then be lowered a distance equivalent to the thickness of one brick. This cycle is repeated until the pallet 74 is loaded with several layers of wet precured brick in a compact block or cube.

The term "precured" has been used extensively throughout the specification in describing the products formed in the mold assembly 13, prior to full curing. As stated earlier, the continuous feed and speed characteristics of the present invention allows the system to take advantage of the "early" or "false set" characteristic of concrete. Very soon after concrete is mixed it begins to set up. However, in prior art systems, this early set is broken, since the forming or mold operations are not completed in time. In the present system, the products are molded quickly enough to prevent this from occurring. Therefore the products ejected from the mold assembly 13 are precured, i.e., as early set has taken place. This gives the products enough strength to allow stacking them in a cube in a wet condition. In prior art systems this would not be possible.

Once a pallet has been sufficiently loaded the cube of brick products is then moved along the conveyor 88 to the heat shrink station 15 (See FIG. 2). Here a thermoplastic bag is placed around the cube and a heating hood 89 is lowered in position therearound to apply heat which shrinks the bag and seals it to the pallet and bricks thereon. The main purpose of the bag is to prevent the escape of moisture from the bricks and to allow the heat of hydration to cure the bricks. In addition, the bag serves as a means for holding the bricks on the pallet and protecting them against the elements.

From the heat shrink station 15 the cubes of brick products are moved to a transfer area 16 where they may be picked up and placed in a storage area for curing. Curing takes place over a period of about 7 days. After this period of time the pallets and bricks thereon may be picked up and transported to a building site for use.

Although only one exemplary embodiment of the invention has been described herein, variations will be apparent to those skilled in the art. For example, the hopper 48 could be made stationary and the mold box 52 adapted to reciprocate between a first position, essentially the same as shown in the drawings, to a second position directly underneath the hopper. Many other variations could be made without departing from the spirit of the invention. It is therefore intended that the scope of the invention be limited only by the claims which follow.

I claim:
1. A method of manufacturing concrete products comprising the steps of:
   a. combining raw materials, including cement and aggregates;
   b. blending said raw materials together;
   c. continuously feeding said blended materials onto conveyor means;
   d. continuously adding liquid to said blended materials as they move along said conveyor means;
   e. continuously mixing said liquid and blended materials together to form a wet concrete mixture as said mixture moves along said conveyor means;
   f. continuously feeding said wet mixture into receiver means so as to maintain a static head therein;
   g. precompacting the wet mix in said receiver;
   h. feeding said wet concrete mixture from said receiver means into mold means while maintaining, in said mold means, the static head of said wet concrete mixture in said receiver means subjecting said mold means to a partial vacuum, and while vibrating said mold and receiver means to form precured concrete products of the desired density without application of external pressure other than said partial vacuum and said static head of said wet concrete mixture; and
   i. removing said precured concrete products from said mold means.

2. A method of manufacturing concrete products as set forth in claim 1 in which steps (h) and (i) are continuously repeated while said wet concrete mixture is continuously fed into said receiver means.

3. A method of manufacturing concrete products as set forth in claim 1 and the further steps of:
   j. placing said precured concrete products on pallet means substantially without voids therebetween; and
   k. curing said precured concrete products without applying external heat thereto.

4. A method of manufacturing concrete products as set forth in claim 3 in which said curing is accomplished by sealing said precured concrete products within a water impermeable material to prevent escape of moisture from said products and to effect said curing by the heat of hydration of said concrete products.

5. A method of manufacturing concrete products as set forth in claim 1 in which said concrete products are formed in said mold means prior to early set of said concrete and in which said precured concrete products, after said early set has taken place, from a plurality of successive removals from said mold means are stacked in layers on top of preceding layers and placed on pallet means, substantially without voids between layers or between products in each layer.

6. A method of manufacturing concrete products as set forth in claim 1 and the further steps of:
   j. stacking said precured concrete products, from successive removals from said mold means, in layers on top of preceding layers, substantially without voids between layers or between products in each layer; and
   k. curing said precured concrete products.

7. A method of manufacturing concrete products as set forth in claim 6 in which said curing is accomplished by sealing said layers of precured concrete products within a thermoplastic material.

* * * * *